G. H. BENJAMIN.
APPARATUS FOR MANUFACTURING STEEL.
APPLICATION FILED NOV. 7, 1913.
1,102,382.
Patented July 7, 1914.
2 SHEETS—SHEET 2.
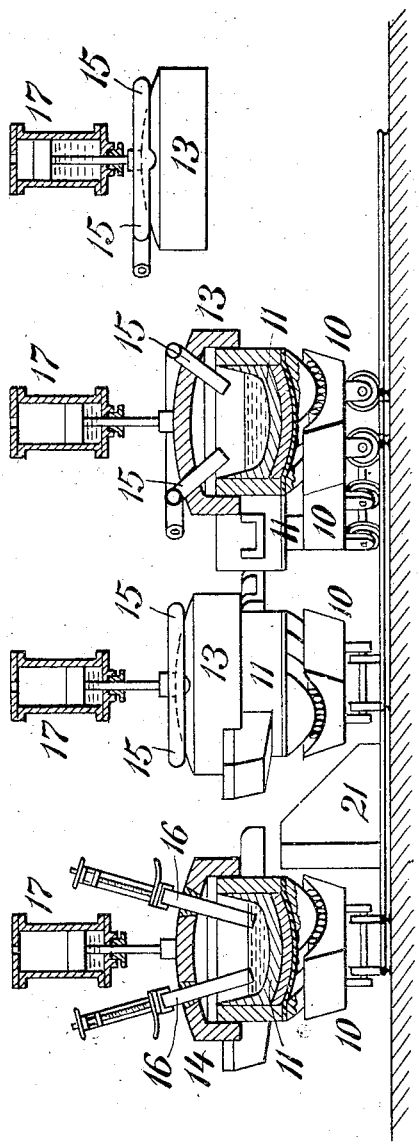
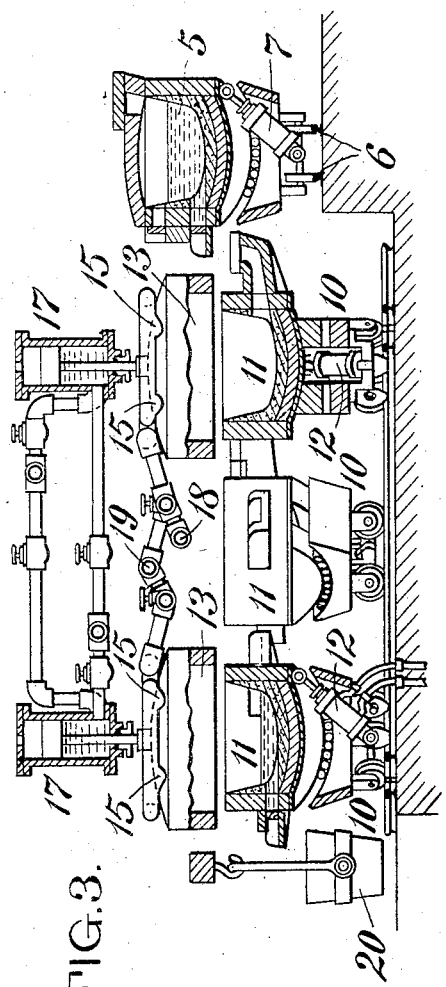

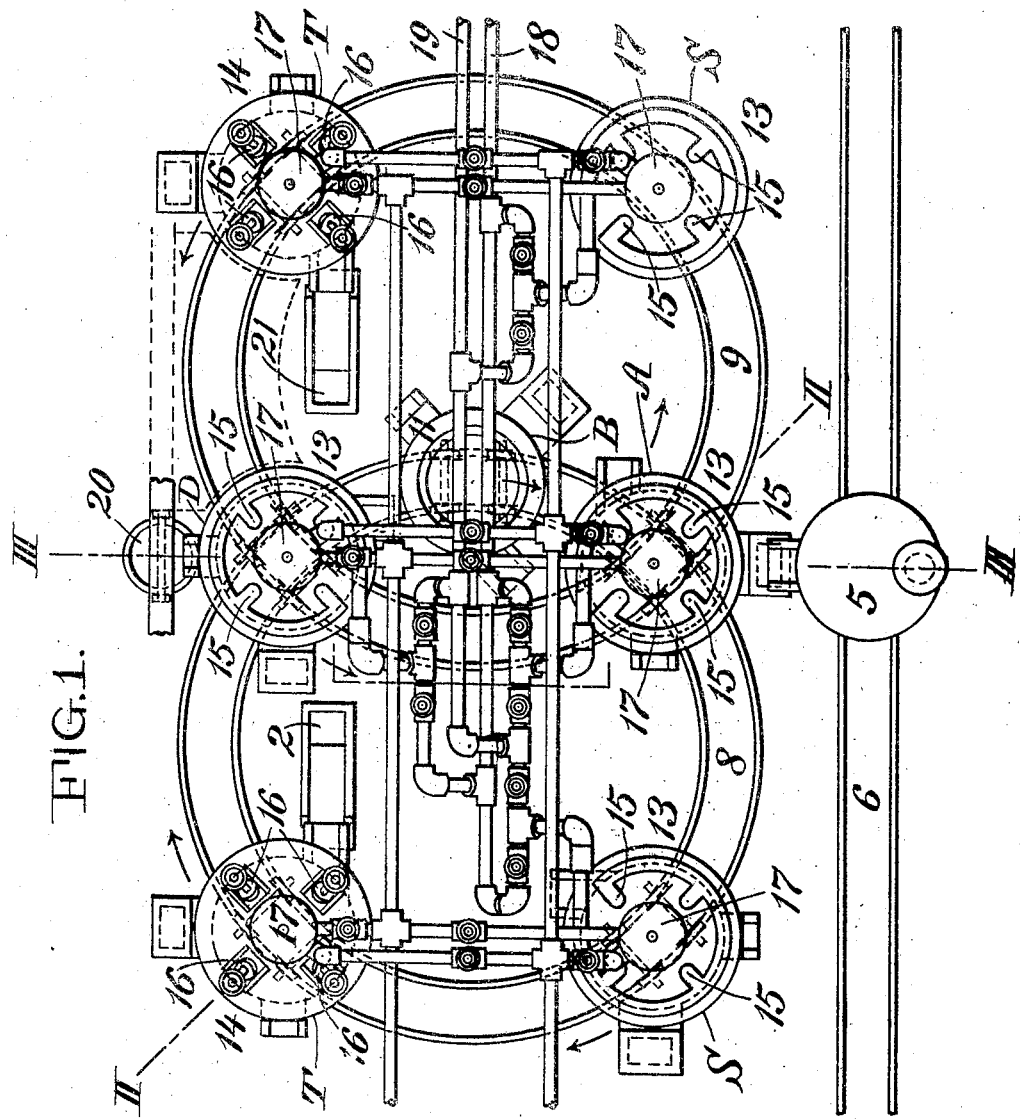

023
UNITED STATES PATENT OFFICE.

GEORGE HILLARD BENJAMIN, OF NEW YORK, N. Y.

APPARATUS FOR MANUFACTURING STEEL.

1,102,382.     Specification of Letters Patent.     Patented July 7, 1914.

Original application filed January 4, 1913, Serial No. 740,103. Divided and this application filed November 7, 1913. Serial No. 799,703.

*To all whom it may concern:*

Be it known that I, GEORGE HILLARD BENJAMIN, a citizen of the United States, residing at New York city, in the county and State of New York, have invented certain new and useful Improvements in Apparatus for Manufacturing Steel, of which the following is a specification.

My invention relates particularly to the treatment of molten steel by high temperature, such as may be obtained in an electric furnace, together with suitable introduced bodies for the removal of phosphorus and other bodies from the steel.

In a prior Patent No. 1,051,065 granted to me, dated January 21st, 1913, I have described a method of treating steel for the removal of phosphorus, etc., and which method involved the introduction of various bodies which will combine with phosphorus and other bodies at the high temperature of an electric arc, after which, purified metal was run into a second furnace, also heated by electricity, and there combined with the necessary amount of carbon or other bodies which it was desired to introduce into the steel. This method further involved the continuous heating by electricity.

My present method differs therefrom in that heating is first effected by regenerated gas and air and subsequently by electricity for only such time as is necessary to bring about the chemical combinations between the introduced bodies and the bodies carried by the steel, which cannot be effected by the gas and air heating.

I am aware that it has been proposed to carry out the above stated process in a single furnace, but experience has demonstrated that it is practically impossible to thus eliminate the necessary amount of phosphorus and other materials, and that this is due to the fact that steel cannot be completely slagged in a single furnace. To overcome the difficulties above set forth, I proceed in the manner which I will now describe, and make use of apparatus such as is illustrated in the accompanying drawings and described in the specification.

This application is filed as a division of my application Serial No. 740,103 filed January 4th, 1913, which application relates specifically to an improvement in the art of manufacturing steel described, the present application being limited to the apparatus set forth for carrying the described art into effect.

Referring to the drawings; Figure 1 represents a plan view of an arrangement of furnaces adapted to carry my invention into effect. Fig. 2 is a vertical section of an electric furnace, a side and vertical section of a gas furnace, and a side elevation of the hood of a gas furnace as removed from the hearth, taken on the line II—II of Fig. 1 looking from the left. Fig. 3 is a vertical section of a gas furnace, a side elevation of the hearth detached from the roof, a side elevation of a gas furnace, and side elevation of a mixer, taken on the line III—III of Fig. 1.

It will be understood from reference to the figures, that they are in a sense diagrammatic and intended not only to show the general construction of the furnaces, but the relation of the furnaces to each other, and also the relation of the movable hearths to the fixed roofs.

Referring to the drawings: 5 represents a mixer of the usual construction, mounted on a track 6 and provided with means 7, consisting of a cylinder and piston operated by a motive fluid for tilting the mixer.

8 and 9 represent two circular trackways which overlap. Mounted in carriages 10 on these trackways, are a series of movable hearths 11. Means 12 are provided for tilting the hearths, consisting of a cylinder and piston operated by a motive fluid.

Located at equidistant points on the trackways 8 and 9, are a series of fixed hoods 13 and 14. The hoods 13 are heated by regenerated gas and air introduced through the medium of the burners 15, and the hoods 14 through the medium of the adjustable electrodes 16. The hoods 13 and 14 occupy a fixed relation to the trackways, but are adjustable vertically, by means 17, consisting of a cylinder and piston operated by a motive fluid. Regenerated gas and air is introduced to the burners 15 through the pipes 18—19, which are supplied with suitable valves for controlling the gas and air. As the arrangement of the pipes for gas and air and the controlling valves may be altered, no specific description is thought necessary of those shown in the drawings.

20 represents a ladle for receiving the molten steel in a finished condition, and 21 slag troughs.

My improved method and the operation of the structure shown and described, may be effected as follows: Bessemerized iron, from which silicon, carbon and phosphorus has been partially removed in a converter (not shown) is discharged into the mixer 5, and from the mixer 5 (shown at the right hand side of Fig. 3) into one of the movable hearths 11, which at the time is under one of the gas hoods 13 (shown at the right hand side of Fig. 2), the purpose of which is to keep the metal hot. If desired, at this time an oxidizing basic flux may be charged upon the metal on the hearth. As soon as the hearth is filled, the hood 13 is raised (as shown at the right of Fig. 3) and the hearth moved along trackway 9 to the position of the gas hood 13 at the right of the mixer. Here it is held for a time under the influence of the heat in the gas hood, when further flux may be introduced. The slag is then withdrawn and the hearth moved under the electric hood 14, and lime or lime and carbon introduced, which, under the influence of the electric heat, will combine with the phosphorus, etc., in the steel, after which it is again cleaned of slag, and the hearth moved forward to the left in front of the discharging position, i. e., in front of the position where the ladle 20 is located as shown at 21 at the top of Fig. 1. At this position further carbon may be introduced. It will be understood that as the first mentioned hearth (designated by the letter A) is moved from the mixing position, a previously emptied hearth (designated by the letter B) is moved into the position formerly occupied by A, along the trackway 8 to be filled, and then moved progressively along the trackway 8 under the successive hearths to the discharging position.

It will be observed from the description, that in moving from the filling position to the second position (designated by the letter S at the right and left) the temperature is such as may be maintained by gas and air with the consequent known reactions, as usual in a basic open hearth furnace, and that when moved to the third position (designated by the letter T at the right and left) the temperature is such as to effect all the reactions usual in an electric furnace, and when moved to the discharging position (designated by the letter D) the temperature is such as to maintain the metal sufficiently fluid to pour.

In Fig. 1 of the drawing, the trackway is illustrated as open, that is, the hearths in moving from one position to the next, are exposed to the atmosphere. Manifestly the trackway may be inclosed (as indicated in dotted lines on the upper right hand corner of Fig. 1) so as to prevent the escape of heat, and further, any mechanical means may be employed to move the hearths upon the trackway. Further, the hearths, while in definite positions or at any part of the trackway, may be cleaned of slag, the removal of the hearths from the hoods allowing unusual facilities for removing the slag.

It will be understood from the description as far as given, that the steps involving the carrying out of the above process are as follows: First: Pouring the metal on to a hearth; then fluxing and subjecting to the temperature such as may be obtained from the regenerated gas and air; then moving the hearth to the second position and again subjecting it to the temperature of regenerated gas and air and again fluxing; then moving the highly heated cleaned or slagged metal into the third position, introducing lime, and there subjecting it to the high temperature and other effects of transmitted electric current to produce final separation of the phosphorus, carbon and other separable materials; then again removing slag and finally moving to the discharging position, there introducing carbon and finally discharging into a ladle or other device.

It will be understood by those skilled in the art to which this invention belongs, that the hearths may have an acid or basic lining, depending upon the treatment to which the material is to subjected. Further, that fluxing may be accomplished with all known fluxes. Further that the temperature effects of the electric current may be obtained either by means of electrodes dipping into the fused material on the hearth thereby heating by resistance; or partially dipping into the material and thereby heating partially by an arc and partially by resistance; or that in place of electrodes, heating might be accomplished by induction, it being within the intent of the invention to use any method of electric heating which will produce the necessary chemical reactions when the hearths are in the third position.

It will be further understood that the major portion of the heat necessary to produce the requisite reactions is created by the combustion of gas and air and that only a small amount of electrical energy is necessary to raise the temperature of the metal on the hearths when under the electric hoods, to that wherein chemical actions may take place which are not possible under the temperatures produced by gas and air, thus effecting a great saving in the cost of the electrical energy and cheapening the process. Further, that owing to the disposition of the hearths as shown in the drawings, rapidity of action and facility of manufacturing is acquired over known methods where attempts have been made to produce the necessary successive reactions, first by the influence of heat through gas and air, and then by electricity in the same furnace. Further, that by reason of the system of movable hearths and fixed hoods, the wear and tear on the hearths and hoods is greatly diminished.

Having thus described my invention, I claim:

1. In an apparatus of the class described, the combination of a mixer, two trackways, a series of movable hearths, a series of hoods occupying fixed position on said trackways, means for heating certain of said hoods and hearths to the temperature due to the combustion of gas and air, and means for heating certain other of said hoods and hearths to the temperature due to the passage of an electric current through the material on the hearths.

2. In an apparatus of the class described, the combination of a mixer, two trackways, a series of movable hearths, a series of hoods occupying fixed positions on said trackways, means for vertically moving said hoods, means for heating certain of said hoods and hearths to the temperature due to the combustion of gas and air, and means for heating certain other of said hoods and hearths to the temperature due to the passage of an electric current through the material on the hearths.

3. In an apparatus of the class described, the combination of a mixer, two trackways, a series of movable hearths, a series of hoods occupying fixed positions on said trackways, means for vertically moving said hoods, means for heating certain of said hoods and hearths to the temperature due to the combustion of gas and air, means for heating certain other of said hoods and hearths to the temperature due to the passage of an electric current, means for tilting said hearths to discharge their contents of slag or metal, and means for receiving the refined metal.

4. In an apparatus of the class described, the combination of a mixer, two circular trackways, a series of movable hearths, a series of hoods occupying fixed positions on said trackways, means for vertically moving said hoods, means for heating certain of said hoods and hearths to the temperature due to the combustion of gas and air, means for heating certain other of said hoods and hearths to the temperature due to the passage of an electric current through the material on said hearths, means for tilting said hearths to discharge their contents of slag or metal, and a ladle for receiving the refined metal.

5. In an apparatus of the class described, the combination of a mixer, two circular trackways, a covering for said trackways, a series of movable hearths, a series of hoods occupying fixed positions on said trackways, means for vertically moving said hoods, means for heating certain of said hoods and hearths to the temperature due to the combustion of gas and air, means for heating certain other of said hoods and hearths to the temperature due to the passage of an electric current through the material on said hearths, means for tilting said hearths to discharge their contents of slag or metal, and a ladle for receiving the refined metal.

6. In an apparatus of the class described, the combination of a mixer, two circular trackways, a series of hearths mounted on wheeled carriages and adapted to be moved over said trackways, a series of hoods occupying fixed positions on and over said trackways, means for vertically moving said hoods, means for heating certain of said hoods and hearths to the temperature due to the combustion of gas and air, means for heating certain other of said hoods and hearths to the temperature due to the passage of an electric current through the material on the hearths, means for tilting said hearths to discharge their contents of slag or metal, and a ladle for receiving the refined metal.

7. In an apparatus of the class described, the combination of a mixer, two circular overlapping trackways, a series of hearths adapted to be moved over said trackways, a series of hoods occupying fixed positions on and over said trackways, means for vertically moving said hoods, means for heating certain of said hoods and hearths to the temperature due to the combustion of gas and air, means for heating certain other of said hoods and hearths to the temperature due to the passage of an electric current through the material on the hearths, means for tilting said hearths to discharge their contents of slag or metal, and a ladle for receiving the refined metal.

8. In an apparatus of the class described, the combination of a mixer, two trackways, a series of movable hearths, a series of hoods occupying fixed positions on said trackways, means for vertically moving said hoods, gas and air pipes connected to certain of said hoods, electrodes connected to certain other of said hoods, means for tilting said hearths to discharge their contents of slag or metal, and a ladle for receiving the refined metal.

In testimony whereof, I affix my signature, in presence of two witnesses.

GEORGE HILLARD BENJAMIN.

Witnesses:
 HELEN E. KOELSCH,
 CONSTANCE H. HANSSON.